US012526370B2

(12) United States Patent
Bouteille et al.

(10) Patent No.: US 12,526,370 B2
(45) Date of Patent: Jan. 13, 2026

(54) METHOD AND SYSTEM FOR CONTROLLING SCAM PHONE CALLS

(71) Applicants: ARAXXE, Lyons (FR); VIAVI SOLUTIONS FRANCE SAS, Sainte-Etienne (FR)

(72) Inventors: Margot Bouteille, Lyons (FR); Fanny Daudies, Lyons (FR); Xavier Lesage, Neuilly sur Seine (FR); Lilian Perron, Lyons (FR); Fabrice Jean Louis Chesneau, Haute Goulaine (FR)

(73) Assignees: ARAXXE, Lyons (FR); VIAVI SOLUTIONS FRANCE SAS, Saint-Etienne (FR)

( * ) Notice: Subject to any disclaimer, the term of this patent is extended or adjusted under 35 U.S.C. 154(b) by 331 days.

(21) Appl. No.: 18/254,130

(22) PCT Filed: Nov. 23, 2021

(86) PCT No.: PCT/FR2021/052072
§ 371 (c)(1),
(2) Date: May 23, 2023

(87) PCT Pub. No.: WO2022/112706
PCT Pub. Date: Jun. 2, 2022

(65) Prior Publication Data
US 2024/0031492 A1    Jan. 25, 2024

(30) Foreign Application Priority Data
Nov. 24, 2020 (FR) ..................................... 2012082

(51) Int. Cl.
*H04M 15/00* (2024.01)
*H04M 15/06* (2006.01)

(52) U.S. Cl.
CPC .......... *H04M 15/47* (2013.01); *H04M 15/06* (2013.01)

(58) Field of Classification Search
CPC ...... H04M 15/47; H04M 15/06; H04M 15/41; H04W 4/24; H04W 12/122; H04L 63/1491
See application file for complete search history.

(56) References Cited

U.S. PATENT DOCUMENTS 8,463,235 B1 *   6/2013   Antonov ............... H04M 3/436
                                                                  455/410
9,332,119 B1 *   5/2016   Danis ................. H04M 3/42042
(Continued)

FOREIGN PATENT DOCUMENTS

| EP | 3324607 A1 | 5/2018 |
|---|---|---|
| EP | 3817351 A1 | 5/2021 |
| WO | 2017/180512 A1 | 10/2017 |

OTHER PUBLICATIONS

"Understanding Telephony Fraud as an Essential Step to Better Fight It", PHD thesis by Merve Sahin, 2017.

*Primary Examiner* — Pakee Fang
(74) *Attorney, Agent, or Firm* — Nath, Goldberg & Meyer; Joshua B. Goldberg

(57) ABSTRACT

The invention relates to a method for controlling scams in which a phone call requests a return call to a target number, comprising the following steps:
  collecting signalling data of phone calls made via a telephone network (2);
  detecting suspicious calls from signalling data collected and using a detection algorithm, and for each suspicious call detected, identifying a suspicious number;
  comparing the suspicious number with a number and/or at least one range of certified target numbers contained in a certification database, and defining a risk profile for the suspicious number accordingly.
Methods and systems for controlling phone scams.

21 Claims, 1 Drawing Sheet

(56) References Cited

U.S. PATENT DOCUMENTS

| | | | | |
|---|---|---|---|---|
| 10,819,847 | B1* | 10/2020 | Darak | H04M 3/38 |
| 2018/0324297 | A1* | 11/2018 | Kent | H04Q 3/0083 |
| 2019/0325345 | A1* | 10/2019 | Baracaldo Angel | G06N 20/00 |
| 2020/0322483 | A1* | 10/2020 | Anand | H04M 3/2281 |
| 2023/0179705 | A1* | 6/2023 | Quilici | H04M 3/436 |
| | | | | 379/210.02 |
| 2024/0297880 | A1* | 9/2024 | Shaffer | H04L 63/0861 |

* cited by examiner

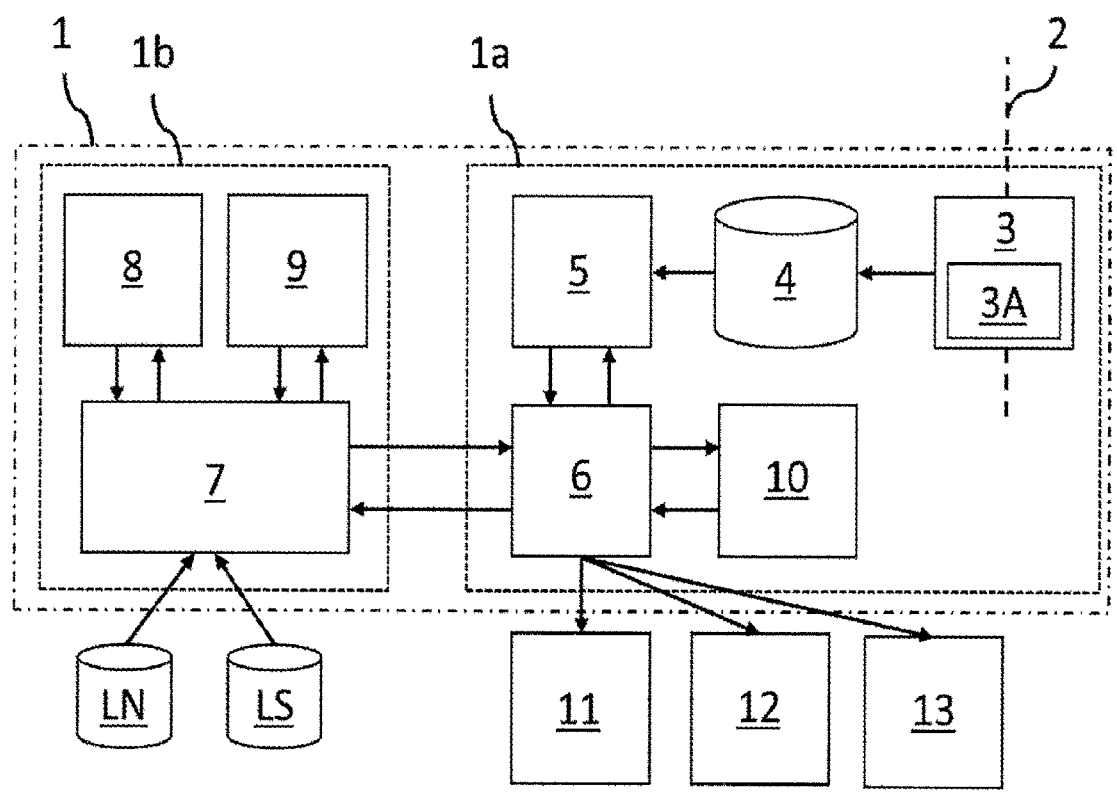

METHOD AND SYSTEM FOR CONTROLLING SCAM PHONE CALLS

This is a National Phase Application filed under 35 U.S.C. 371 as a national stage of PCT/FR2021/052072, filed Nov. 23, 2021, an application claiming the benefit of French Application No. FR2012082, filed Nov. 24, 2020, the content of each of which is hereby incorporated by reference in its entirety.

TECHNICAL FIELD

The present invention relates to the general technical field of telecommunications, and in particular phone calls. The present invention more particularly relates to the technical field of methods and systems for fighting a phone fraud comprising the making of a phone call, called hereinafter soliciting call, soliciting a return phone call to a target number, called hereinafter target number.

PRIOR ART

This type of phone fraud usually appears in the following three main alternatives. According to a first alternative, which is the most often observed, the fraud is known as "ping call" (or "appel-piège" in French, or also "wangin" in Japanese), the soliciting call being a vocal phone call. It consists for a fraudster in calling a telephone operator subscriber without leaving the latter the time to pick up the call or by interrupting the call very quickly. Faced with such a missed or interrupted call, the subscriber is in fact encouraged to call back the corresponding sender number (calling number) displayed on his or her phone, wherein said sender number may be a premium rate Value-Added Service (VAS) number or a number to which making a call generates high outgoing interconnection costs for the solicited subscriber's operator. When the subscriber calls back the displayed calling number, the fraudster searches to maximize the communication time to get part of the corresponding interconnection revenues, using for example a voice response system that automatically picks up the call and then plays music on hold or a pre-recorded voice message. According to a second alternative, the soliciting call is also a voice phone call, but this time, when the client picks up the call, a voice response system plays a pre-recorded voice message asking them, under any false pretext, to call back a phone number given in the voice message. According to a third alternative, the soliciting call is a text message (for example, SMS) or multimedia message (for example, MMS), whose content enjoins the subscriber to make a return vocal phone call or text or multimedia message to either the sender number that is displayed for the message received by the client, or to another phone number contained in said message. In these two other alternatives, the phone number to which the subscriber is invited to make a return phone call is generally also a premium rate VAS number or a number to which making a call or a message generates high outgoing interconnection costs for the solicited subscriber's operator.

This type of fraud is prejudicial first for the telephone operator subscriber, who is charged a sometimes significant sum by his or her operator for the call or message he or she has made to the target number in response to the fraudster solicitation. It is also detrimental to the telephone operator, which faces increased outgoing interconnection costs, and possibly dissatisfaction and request for refund from the subscriber as regards the amounts charged to the latter. When the target number used by the fraudster is a foreign phone number, the telephone operator must pay a termination charge to the transit operator to which it entrusts the routing of the customer's call or message to the foreign target number. With the complicity of the transit operator or even without the latter's knowledge, the fraudster makes sure to perceive part of these international termination charges for its benefit. As such, this fraudulent scheme belongs to a wider fraud family, called "International Revenue Share Fraud" (IRSF). Carried out in a massive way with waves of soliciting calls to a large number of clients, such a fraud is particularly lucrative for the fraudster, and symmetrically, particularly costly and penalising for telephone operators and their subscribers.

That is the reason why the telephone operators seek to put in place solutions for preventing at best the implementation of such a fraud on their networks and the consequences thereof. To be efficient, these solutions must detect as quickly as possible the fraudulent soliciting calls, in the most discriminating manner possible (that is to say in particular by limiting the risk of confusion with unsuccessful legitimate appeal attempts), in such a way as to allow the implementation of targeted remedies against fraud without the risk of impacting legitimate users of the telephone networks.

DISCLOSURE OF THE INVENTION

The objects assigned to the invention therefore aim to provide an answer to the above-mentioned problem and to propose a new method and a new system for fighting the above-described phone fraud, which allow quick detection of fraudulent calls and quick and efficient implementation of appropriate and targeted remedies against fraud.

Another object of the invention aims to propose a new method and a new system for fighting the above-described phone fraud, which allow a particularly accurate detection of fraudulent calls.

Another object of the invention aims to propose a new method and a new system for fighting phone fraud, which are substantially transparent or particularly low impact for legitimate users of the telephone networks.

Another object of the invention aims to propose a new method and a new system for fighting phone fraud, which, while being particularly efficient, is nevertheless relatively simple to deploy and implement.

Another object of the invention aims to propose a new method and a new system for fighting phone fraud, which are particularly adaptable to the needs and strategies of the telephone operators as regards fraud fighting.

The objects assigned to the invention are achieved by means of a method for fighting a phone fraud comprising the making of a phone call, called soliciting call, soliciting a return phone call to a phone number, called target number, said method comprising the following steps:
  collecting E1 data signalling phone calls made via a telephone network of a telephone operator;
  detecting E2 suspicious phone calls from collected signalling data and using at least one detection algorithm, and for each detected suspicious phone call, identifying E3 and storing a phone number, called suspicious number, to which said phone call is suspected to fraudulently solicit a return phone call to be made;
  comparing E4 said suspicious number with at least one phone number and/or at least one range of phone numbers, called certified target numbers, contained in a certification database, and defining E5 for said suspicious number a different risk profile according to whether said suspicious number corresponds or not to a certified target number and/or to a number belonging to a range of certified target numbers contained in said certification database.

The objects assigned to the invention are also achieved by means of a system for fighting a phone fraud comprising the making of a phone call, called soliciting call, soliciting a return phone call to a phone number, called target number, said system comprising a network signalling data collecting device for collecting data signalling phone calls made via a telephone network of a telephone operator, and software and/or hardware means for implementing the method according to the invention.

BRIEF DESCRIPTION OF THE DRAWINGS

Other features and advantages of the invention will appear in more detail upon reading of the following description, with reference to the appended FIGURE, given by way of purely illustrative and non-limiting example.

FIG. 1 schematically illustrates a preferential embodiment of a system for fighting phone fraud according to the invention.

WAYS TO IMPLEMENT THE INVENTION

According to a first aspect, the invention relates to a method for fighting a phone fraud, said fraud comprising, as explained hereinabove, the making of a phone call, called soliciting call, by a fraudster to a subscriber of a telephone operator (phone operator). This soliciting call solicits a return phone call to be made by the subscriber to a phone number, called target number, to the benefit of the fraudster. According to another aspect, the invention moreover relates to a system 1 for fighting such a fraud, said system 1 being advantageously designed and configured to implement the fighting method according to the invention. As will be illustrated hereinafter, said system 1 thus comprises for that purpose software and/or hardware means for implementing said method. In the following, said fraud-fighting method and system 1 will be described in parallel, it being understood that the elements describing the method also apply to the system 1, as well as the elements describing the system 1 apply mutatis mutandis to the method. FIG. 1 schematically illustrates a preferential embodiment of a system 1 for fighting fraud according to the invention. This embodiment is obviously given here by way of purely illustrative and non-limiting example.

The method according to the invention comprises a step E1 of collecting signalling data of phone calls made via a telephone network 2 of a telephone operator, which is typically made using a network signalling data collecting device. The concerned telephone network 2 is typically a telephone network of a given telephone operator, wanting to fight against soliciting call fraud (and in particular of the ping-call type) on its telephone network and aiming at its subscribers (incoming soliciting calls). It may be a mobile telephone network, a fixed telephone network or also a fixed and mobile telephone network. The calls, for which signalling data are collected, may be voice-format phone communications, i.e. voice phone calls and/or text or multimedia phone messages (typically, at SMS or MMS format). By "phone calls made", it is here advantageously understood phone calls that have been initiated and/or routed through the telephone network 2 of the telephone operator, preferably phone calls that are initiated and/or routed through the telephone network 2 up to reach a phone number which is the recipient of the phone call, more preferably phone calls that have then been finalized so that the telephone line has been released. They are thus preferentially phone calls that have effectively reached a recipient subscriber, either directly (for example, with the emission of an incoming call warning signal on a phone terminal of the recipient subscriber, possibly followed with the establishment of a voice call if the subscriber picks up the call, or the delivery of a text or multimedia message to the phone terminal of the recipient subscriber), or indirectly (for example, via a subscriber voice mail corresponding to the recipient phone number).

According to an alternative, the signalling data may be collected using a collecting device 3 consisted of one, i.e. comprising one, network signalling probe system 3A connected to said phone network 2. Typically passive, the network signalling probes are hardware and/or software devices well known as such. Interfaced, connected, to the telephone network 2 and to its signalling system(s), at chosen collecting points (for example at physical interfaces between the network equipment devices), the network signalling probes are configured to passively monitor the telephone network signalling channels 2, and collect on these later and record in real time (or almost real time) signalling data relating to the phone calls in which the telephone network 2 is involved, with a view to a particular application processing. It is therefore a network signalling probe system 3A that is external to the telephone network 2, independent of the latter, and that thus does not belong to a signalling network of said telephone network 2. Such a network signalling probe system 3A does not intervene as such in the making of phone calls through the telephone network 2. Typically, the network signalling probe system 3A thus collects a number of signalling data and advantageously compile them, for each concerned telephone call, for example in a "Call Detail Report" or "Call Detail Record" or also "Call Data Record" (CDR). According to another alternative, said signalling data may be collected, and advantageously compiled as call detail records, directly using one or several dedicated software modules embedded in network equipment of the telephone network (or "integrated probes"). In this case, the signalling data are thus not collected through "external" probes connected to the telephone network, but directly by technical equipment belonging to the latter and in charge of the transmission, the establishment, of the phone calls and the generation/reception of the corresponding signalling data. In practice, the implementation of a signalling data collecting device 3 comprising a system 3A of (typically passive) network signalling probes connected to said telephone network 2 is more advantageous. Indeed, the use of such a network signalling probe system 3A, external to the telephone network 2 of the telephone operator, advantageously limits the need to use, or even modify, the existing network equipment devices of the telephone operator. This facilitates the implementation of the fraud fighting system 1 and of the related method. This further limits the risk of disturbing the good operation of the telephone network 2.

Step E1 of collecting signalling data therefore consists in collecting, in real time or almost real time, for example using a network signalling probe system 3A, data relating to phone numbers involved in said phone calls as well as, preferably, time data relating to said phone calls. Thus, said signalling data are advantageously collected during the initialization and/or the routing of said phone calls through the telephone network 2, preferably during the establishment of the phone calls, as well as also preferably during the second(s) that follow(s) the end of the concerned phone calls, i.e. after the release of the corresponding telephone line.

For a given phone call, in the voice format or text or multimedia message format, the so-collected signalling data may in particular include, as data relating to the phone numbers:
- the call recipient phone number (recipient "ISDN", or called party number in the case of voice call communication), and/or
- the call originating phone number (originating "ISDN", which is really at the origin of the call), and/or
- a phone number, called hereinafter sender number, intended to be displayed on the recipient phone terminal (i.e. as the "caller" number in case of voice call communication). As known as such, the sender number to be displayed may possibly be different from the above-mentioned originating phone number. It is indeed a phone number that will be displayed on the recipient phone terminal, but that may not be the phone number really at the origin of the call, i.e. the phone number really used to make or route the call to the recipient.

For a given phone call, the signalling data collected may typically include, as associated time data, a time stamp of the moment at which the phone call in initiated from the call originating phone number, a time stamp of the moment at which the communication is established a recipient (or called party), a time stamp of the moment at which the communication is released by the sender (or caller) or by the called party, and/or also a time stamp of the moment at which the signalling link relating to the call is released after interruption of the call. It is here understood that it is particularly advantageous that the concerned phone calls are phone calls that are not only initiated and/or routed, but that have also reached the corresponding recipient number (whether or not the recipient subscriber has picked up the call in the case of voice-format call), insofar as this allows collecting and compiling such time data, particularly useful for detecting a fraud of the "ping-call" type, which is often characterized by voice-format phone calls with a very short duration of incoming call warning signal (ring) or a voice call establishment duration that is zero or very short (typically only a few seconds).

To implement step E1 of collecting signalling data, the system 1 according to the invention thus comprises a network signalling data collecting device 3 for collecting signalling data of phone calls made via a telephone network 2 of the concerned telephone operator (such as for example a system 3A of typically passive network signalling probes, as described hereinabove, which is connected, interfaced, to said telephone network 2). Advantageously, the system 1 comprises a dedicated signalling database 4 in which the so-collected signalling data are stored, in a volatile or non-volatile memory.

The method according to the invention then comprises a step E2 of detecting suspicious phone calls, from signalling data collected during the above-mentioned collection step E1 and using at least one detection algorithm. Step E2 of detecting suspicious phone calls thus aims to detect, among a set of phone calls made via the concerned telephone network 2 and using signalling data associated with these phone calls, particular calls that are liable to be soliciting calls, as defined hereinabove.

Advantageously, step E2 of detecting suspicious phone calls implements one or several detection algorithms using one or several traffic profiles based on a combination of significant indicators defined, constructed, from collected signalling data. In other words, step E2 of detecting suspicious phone calls advantageously implements a behaviour analysis of the phone calls for which signalling data have been collected during the collection step E1. Particular threshold values are advantageously defined and adjusted for all or part of the significant indicators to reach a good compromise between detection accuracy and speed of execution of the detection step E2. By way of non-limiting examples, in case of detection of voice-format soliciting calls of the "ping call" type, all or part of the following significant indicators, defined from collected signalling data, may advantageously be implemented:
- call frequency: number of incoming voice phone calls on the telephone network 2 higher than a predefined threshold value, over a predefined past time period, made by a same sender number and/or a same call originating phone number, or by sender numbers and/or call originating phone numbers belonging to a same range of phone numbers;
- call ring duration (incoming call warning) for a given incoming call on the phone network 2: tone duration higher than a predefined threshold value (typically non-zero);
- duration of incoming communication established on the telephone network 2 for a given call: duration of established communication—after a given voice phone call has been picked up by the recipient of the latter—lower than a predefined threshold value (typically lower than a few seconds);
- geographical origin of the caller number for a given call:
  - international phone code for the sender number and/or the originating phone number, associated with a given voice phone call, corresponding or not to the international phone code of the country of the telephone operator operating the concerned telephone network; and/or
  - international phone code for the sender number and/or the originating phone number, associated with a given voice phone call, belonging or not to one or several groups of international phone codes;
- call back frequency: number of voice phone callbacks higher than a predefined threshold value (typically at least equal to one), over a predefined time period, to a given sender number having previously been observed, over a predefined past time period, for a plurality of incoming voice phone calls made;
- duration of established communication for a given callback: duration of established communication—after picking up of a given voice phone callback to a given sender number having been previously observed, over a predefined past time period, for a plurality of voice phone calls having been made, higher than a predefined threshold value (typically higher than at least a few seconds); etc.

The method comprises, for each suspicious phone call so detected by analysis of collected network signalling data, a step E3 of identifying and storing a phone number, called suspicious number, to which said phone call is thus suspected to fraudulently solicit a return outgoing phone call by the recipient. In other words, a so-called suspicious number is thus a phone number suspected to be a fraudulent target number. Typically, the suspicious number may correspond to the sender number associated with the phone call detected as suspicious, i.e. to the phone number intended to be displayed on the recipient (called party) phone terminal. Advantageously, said sender number is contained, as such, in the collected network signalling data. As explained hereinabove, the sender number is not necessarily the originating number of the suspicious phone call that has been detected. Therefore, the detection algorithm(s) implemented for carrying out step E2 of detecting suspicious phone calls is thus defined, designed, to detect specifically from collected signalling data phone calls that, based on certain criteria and certain typical characteristics of phone calls or ping-calls (as mentioned hereinabove), are liable to constitute fraudulent calls (or "soliciting calls"). Step E3 of identifying and storing a suspicious number has reciprocally for object to identify and store a phone number associated with a phone call detected as suspicious, insofar as this phone number is thus liable to be a "target" number, as defined hereinabove. In other words, step E3 is thus a step of identifying and storing a phone number (suspicious number) to which a phone call is, at the end of step E2, suspected to solicit a return phone call by the recipient subscriber.

Advantageously, each identified suspicious number is stored into a list L1 of suspicious numbers, either by creating a new entry in the list L1 when the identified suspicious number is not contained in the latter (new suspicious number), or by incrementing statistics linked to said suspicious number when the latter has already been identified in the past. Advantageously, each new entry or statistics incrementation in the list L1 is time stamped. Step E2 of detecting suspicious phone calls and step E3 of identifying and storing a suspicious number associated with a suspicious call are advantageously carried out continuously, in order to feed and update as quickly as possible the list L1 of suspicious numbers.

Symmetrically, the system 1 according to the invention comprises, in addition to said signalling data collecting device 3, software and/or hardware means for implementing said step E2 of detecting suspicious phone calls and said step E3 of identifying and storing a suspicious number associated with a suspicious call. As in the embodiment illustrated in FIG. 1, the system 1 advantageously comprises for that purpose a computer detection platform 5, advantageously connected in data communication with the signalling database 4, and that implements the above-mentioned detection algorithm(s). As in the embodiment illustrated in FIG. 1, the detection platform 5 is advantageously connected in data communication with a first server 6 (or first set of servers 6), to which the detection platform 5 transmits, preferably continuously, information relating to the detected suspicious phone calls, including in particular information relating to identified suspicious numbers. Advantageously, the first server 6 thus comprises in particular a list management module to store information relating to suspicious numbers transmitted by the detection platform 5 in a list L1 of suspicious numbers, as mentioned hereinabove.

Preferably, the signalling database 4 and the first server 6 belong to a first sub-system 1a of the fraud fighting system 1 that is arranged within the technical infrastructures of the concerned telephone operator.

The method according to the invention moreover comprises a step E4 of comparing at least one suspicious number, which has thus been identified for a suspicious phone call detected from collected signalling data, with at least one phone number and/or at least one range of phone numbers, also called certified target number(s), contained in a certification database. In this last case, the comparison step E4 is thus in other words a step E4 of matching the suspicious number with said (at least one) range of certified target numbers. Hence, each identified suspicious number is compared with the content of a predefined certification database, which advantageously contains:

phone numbers (certified target numbers) that have been previously identified as having already been involved in a phone fraud in the past, and in particular in a soliciting call fraud, and/or ranges of phone numbers (ranges of certified target numbers), defined from such phone numbers previously identified as having already been involved in a phone fraud in the past.

Said comparison step E4 is thus distinct from step E2 of detecting suspicious phone calls and step E3 of identifying and storing a suspicious phone number, and consecutive to these latter. Said steps E2 and E3 thus advantageously allow performing a pre-sorting, i.e. a first level of analysis, in order to apply to step E4 of comparison using the certification database only phone numbers that have previously been identified as suspicious for "ping-call" fraud. This allows in particular making the method according to the invention particularly efficient, while limiting the consumption of material and energy resources.

The method according to the invention comprises, after the comparison step E4, a step E5 of defining, for said suspicious number, a different risk profile (or "risk profile sheet") according to whether said suspicious number corresponds or not to a certified target number and/or to a number belonging to a range of certified target numbers contained in said certification database. The comparison step E4 thus aims to certify the suspicious number as a target number, in such a way that a higher risk profile can then be defined for the suspicious number is the latter is certified as a target number, than if said suspicious number does not correspond to a known certified target number or does not belong to a known range of certified target numbers. Advantageously, said step E5 of defining the risk profile comprises an operation of storing the so-defined risk profile. For example, step E5 of defining a risk profile may consist in integrating in the list L1 of suspicious numbers, for each identified suspicious number, a "risk profile" field comprising at least:

a "Suspicious" parameter, able to take a "Yes/No" binary value, said value being set to "Yes";

a "Certified" parameter, able to take a "Yes/No" binary value, said value being chosen according to the result of the so-performed comparison.

By so detecting a suspicious number as early as possible, directly from network signalling data, and based on a risk profile defined for this suspicious number by confrontation with already known certified target numbers and/or ranges of certified target numbers, it thus becomes possible for the telephone operator to very quickly trigger one or several differentiated fraud protection actions against the suspicious number and/or a recipient number of a phone call in which the suspicious number in involved, i.e. one or several preventive and/or curative actions adapted to the risk profile of said suspicious number. For example, the telephone operator can then decide to inform all its subscribers having received a suspicious incoming phone call, without having to block the making of return outgoing phone calls by the subscribers to a suspicious number if the latter does not correspond to a certified target number or to a number belonging to a range of the certified target numbers. The telephone operator will possibly keep such a blockage for the only outgoing phone calls made by its subscribers to a suspicious number that would have effectively been certified as a target number.

In view of the above, the implementation of the comparison step E4 advantageously allows, as the case may be, efficiently handle the case of a phone number that, although identified as a suspicious number at the end of the above-described steps E2 and E3, is actually associated with a phone number initiated in error (for example, following an error of a caller in entering the number), without fraudulent purpose. Indeed, in this case, such a phone number will then advantageously be allocated, during step E5, with a low or zero risk profile insofar as it would not correspond to a known certified target number in the certification database.

Advantageously, said list L1 of suspicious numbers may further comprise, in relation with each of the so-listed suspicious numbers, statistics relating in particular to, for example:

identified suspicious phone calls for the suspicious number: total number of identified suspicious phone calls, date and hour of the first identified suspicious phone call to a subscriber of the telephone operator, date and hour of the last identified suspicious phone call to a subscriber of the telephone operator, etc.

and/or potential phone calls made in response to suspicious phone calls (i.e. "callback" in the case of a voice-format call): total number of phone calls, total number of subscribers of the telephone operator having made a return phone call, ratio of return phone calls, total duration and/or average duration of the return phone calls, date and hour of the first return phone call of non-zero duration made by a subscriber of the phone operator, date and hour of the most recent return phone call of non-zero duration made by a subscriber of the phone operator, etc.

Symmetrically, the system 1 according to the invention comprises software and/or hardware means for implementing the above-described steps E4 and E5 of the method. Thus, as in the embodiment illustrated in FIG. 1, the system 1 advantageously comprises a second server 7 (or second set of servers 7), that hosts said certification database. Preferably, the second server 7 is distinct from the first server 6 mentioned hereinabove, and belongs to a second sub-system 1b of the fraud fighting system 1 that is arranged outside the technical infrastructures of the concerned telephone operator. The second server 7 is then advantageously connected in data communication with the first server 6, typically through a communication network of the Internet type, for example via a VPN, in such a way that each identified and stored suspicious number (step E3) is sent to the second server 7, either individually or in real time, or as suspicious number batch with a predefined sending rate, in order to be compared (step E4) with at least one number and/or at least one rate of certified target numbers contained in the certification database. In return, information relating to the result of the comparison is sent by the second server 7 to the first server 6, in such a way as to allow the definition (step E5) of the risk profile of each of the suspicious numbers by said first server 6.

The certified target numbers and/or number ranges contained in the certification database typically come from at least one source of certified target numbers and/or number ranges for the certification database, and preferably from a plurality of difference sources, in order to optimize the performances of certification of the suspicious numbers. It will be noted here that the use of individual numbers is advantageous for the certification accuracy, whereas the use of number ranges is rather advantageous for the speed of certification (because it is possible to consider a number as being fraudulent as soon as it belongs to a range of fraudulent numbers, even if it has not been identified individually as being fraudulent).

Thus, advantageously, the certification database is fed with (and thus contains at least) certified target phone numbers and/or phone number ranges that are certified target numbers and/or certified target number ranges defined from certified target numbers, which have been previously identified for phone calls received by at least one phone robot using at least one phone number managed by the telephone operator involved in the method. As such, the fraud fighting method preferentially comprises:

an operation O1 of receiving at least one (incoming) phone call by at least one first phone robot 8 using at least one phone number, called hereinafter internal robot number, managed by the telephone operator and, for a phone call so received at the internal robot number, an operation O2 of identifying a corresponding target number, to which said (incoming) phone call solicits fraudulently a return (outgoing) phone call, which is followed with an operation O3 of storing the identified target number in the certification database as a certified target number, and/or an operation O4 of defining a range of target numbers including said identified target number and an operation O5 of storing said range of target numbers into the certification database as a range of certified target numbers.

The first phone robot 8 is a technical device that, in the case for example in which the telephone network 2 is a mobile phone network, is typically connected to at least one server of SIM card(s) using at least one internal robot number and advantageously controlled by dedicated software means. The first phone robot 8 is configured at least to receive incoming phone calls (passive operation) intended for the internal robot number through the telephone network 2 of the telephone operator to which the SIM card(s) are connected. Obviously, the first phone robot 8 can alternatively be configured to connect to a fixed telephone network 2 of the telephone operator, to receive incoming phone calls intended for the internal robot number. Advantageously, the first phone robot 8 is configured to generate a Call Detail Report or Call Detail Record or Call Data Record (CDR) for each incoming phone call received at the internal robot number. As such, the first phone robot 8 is advantageously configured (for example, using a specific computer script) to automatically pick up, upon reception of an incoming phone call in the form of a voice phone call. Such a call detail report could advantageously constitute an opposable element of evidence in matters of fraud.

Insofar as the internal robot number is not a phone number used by a real person subscriber of the telephone operator, it is unlikely that the internal robot number is daily the recipient of legitimate phone calls. On the other hand, the internal robot number is liable to receive soliciting calls in the same way as phone numbers used by real persons, insofar as such soliciting calls are very often sent to masses of numbers without prior attribution check by the fraudsters. It is then more easy to identify accurately and reliably fraudulent target numbers by analysing phone calls received by one or several robots, than by analysing a very large number of phone calls daily made through a telephone network to a multitude of subscribers of a telephone operator. In other words, said at least one first phone robot 8 and the associated SIM card server advantageously play a lure role, in order to identify at least passively target numbers used by fraudsters. Preferably, a plurality of first phone robots 8 using a plurality of internal robot numbers is implemented, in order to optimize the identification of target numbers.

As indicated hereinabove, the internal robot number is chosen among phone numbers managed by the telephone operator (i.e. allocated to the telephone operator, by a numbering plan or by a portability mechanism) that operates the telephone network 2 concerned by the method, in such a way that the incoming phone call received by the first phone robot 8 is an incoming phone call made on the telephone network concerned by the method, to which said internal robot number is thus connected. This advantageously allows focusing the fight to a fraud that would more specifically aim the subscribers of said telephone operator and to identify similar incoming call patterns between calls received by the first phone robot 8 and incoming calls intended for subscribers of the telephone operator.

Typically, the incoming phone call received by the first phone robot 8 at said internal robot number may be a soliciting call in the form of a voice ping call, as described hereinabove. The certified target number is then the sender number associated with the voice soliciting call received at the internal robot number. Insofar as the internal robot number is not a phone number used by a real person, it is advantageously possible to accede to the content of the phone call which the internal robot number is the recipient of, without confidentiality constraints and for the purpose of analysis, to identify a target number. Thus, it may also be advantageously received at the internal robot number a soliciting call in the form, for example, of:

- a voice phone call that, once picked up by the first phone robot 8, plays a pre-recorded voice message inciting to call back a phone number given in the voice message, wherein said pre-recorded given phone number can thus be identified as a target number;
- a text message (for example, SMS) or multimedia message (for example, MMS), whose content incites to send in return a voice phone call or a text or multimedia message, either directly to the sender number associated with the message, and said sender number will thus be identified as a target number, or to a different number than the sender number associated with the message and contained in the message body. The number indicated in the message body can then be identified as a target number.

Each so-identified suspicious number is thus stored in the certification database, either by creating a new entry in the certification database when the target number identified using the first phone robot 8 is not contained in the latter (new target number), or by incrementing statistics linked to said target number when the latter has already been identified in the past. Advantageously, each new entry or statistics incrementation in the certification database is time stamped.

Symmetrically, the fraud fighting system 1 comprises software and/or hardware means for implementing the operation O1 of receiving a phone call by the first phone robot 8, said operations O2, O3 of identifying and storing a corresponding target number and/or said operations O4, O5 of defining and storing a range of target numbers, as these latter have been described hereinabove. In particular, the system 1 comprises at least one first phone robot 8, as described hereinabove. Using at least one phone number, said internal robot number, said first robot 8 is configured to receive at least one phone call. Advantageously, the system 1 comprises a plurality of first phone robots 8 each using a plurality of internal robot numbers, which allows in particular increasing the number of internal robot numbers liable to receive soliciting calls, and hence increasing the number of identifiable certified target numbers. The system 1 advantageously comprises one or several SIM card servers (in the case of a mobile telephone network 2) using at least one or several internal robot numbers, to which the first phone robot(s) 8 are typically connected, and dedicated software means for piloting said SIM card server(s). The SIM card server can be on a remote site with respect to the first phone robots 8, or on the same site(s) as the first phone robot(s) 8. The SIM card server can be in communication with each of the first phone robots 8 through a communication network of the Internet type, for example via a VPN. As in the embodiment illustrated in FIG. 1, the second server 7 of the system 1 is connected in data communication with the first phone robot(s) 8, typically through a communication network of the Internet type, for example via a VPN. Preferably, the first phone robot(s) 8 and the SIM card server(s) belong to the second sub-system 1b of the fraud fighting system 1. The second server 7 typically comprises a module for analysing phone calls received by the first phone robot(s) 8 at the internal robot number(s) to identify, for each of the phone calls received, a corresponding target number (operation O2) and store the latter (operation O3) and/or to define and store a corresponding range of target numbers (operations O4 and O5).

Advantageously, the second server 7 is configured to transmit to the first server 6 information relating to target numbers (certified target numbers) so identified using the first phone robot 8, and/or to ranges of target numbers defined from so-identified target numbers (ranges of certified target numbers). Even more advantageously, the second server 7 is configured to transmit (preferably in real time) to the first server 6, for each certified target number, a time stamp of the reception by the first phone robot 8 of the corresponding soliciting call, and information relating to the format of the latter (voice phone call or text/multimedia message). In return, the first server 6 advantageously comprises a list management module for storing information relating to certified target numbers transmitted by the second server 7 in a list L2 of certified target numbers, either by creating a new entry in the list L2 when the identified target numbers is not contained in the latter (new target number), or by incrementing statistics linked to said target number when the latter has already been identified in the past. Advantageously, each new entry or statistics incrementation in the list L2 is time stamped.

Advantageously, said list L2 of certified target numbers can be merged or combined with the above-mentioned list L1 of suspicious numbers. This allows in particular a simplification of the implementation of the method, by reducing the number of lists to be handled. This further allows an optimization of subsequent implementation of differentiated protection actions, insofar as it is advantageous to take actions both relating to suspicious numbers, according to the risk profile of these latter, and relating to certified target numbers, which may not necessarily have been identified for phone calls made via said telephone network 2. In this case, the list of suspicious numbers and the list of certified target numbers form together a list L1L2 of suspicious and/or certified target numbers. For example, it is then possible to provide, for each target number identified using the robot and so listed, a "risk profile" field comprising at least:

- a "Suspicious" parameter, able to take a "Yes/No" binary value, said value being then set to "No", in the hypothesis that the certified target number in question has not been already compared with success with a suspicious number identified at step E3;

a "Certified" parameter, able to take a "Yes/No" binary value, said value being set to "Yes.

As an alternative or preferably additionally, the certification database is fed with (and thus contains at least) certified target numbers and/or number ranges that are certified target numbers and/or ranges of certified target numbers defined from certified target numbers, which have been previously identified for phone calls received by at least one phone robot using at least one phone number managed by another telephone operator than that involved in the method. As such, the fraud fighting method preferentially comprises:

an operation O6 of receiving at least one (incoming) phone call by at least a second phone robot 9 using at least one phone number, called hereinafter external robot number, managed by another telephone operator and, for a (incoming) phone call so received at said external robot number, an operation O7 of identifying a corresponding target number, to which said (incoming) phone call solicits fraudulently a return (outgoing) phone call, which is followed with an operation O8 of storing the identified target number in the certification database as a certified target number, and/or an operation O9 of defining a range of target numbers including said identified target number and an operation O10 of storing said range of target numbers into the certification database as a range of certified target numbers.

The principle of operations O6 to O10 is here in all respects similar to the one described hereinabove for operations O1 to O5, except that this time the robot number (external robot number) is chosen among phone numbers managed by at least another telephone operator than that which operates the telephone network concerned by the method, so that the incoming phone call received by the second phone robot 9 is a communication made on another telephone network than that concerned by the method. This advantageously allows feeding the certification database with certified target numbers and/or ranges of certified target numbers, which have been detected for soliciting call frauds on other telephone networks and not necessarily yet on the telephone network 2 of the telephone operator. It is therefore advantageously possible to anticipate future frauds or fraud attempts on the telephone network 2 of the telephone operator. Apart from this difference of telephone network, what has been described hereinabove for operations O1 to O5, both in terms of method and system, advantageously applies mutatis mutandis for operations O6 to O10.

As mentioned hereinabove, the fact that an internal or external robot number is not a phone number used by a real person makes it advantageously possible to accede to the content of the phone call which the internal or external robot number is the recipient of, without confidentiality constraints. Thus, for at least one phone call received by the first robot 8 at the internal robot number and/or for at least one phone call received by the first robot 8 at the external robot number, the fraud fighting method may advantageously comprise an operation O11 of recording and an operation O12 of analysing a content of said phone call received by said first robot 8 and/or by said second robot 9. This analysis may advantageously lead to increase the certainty of fraud of the identified target number (operation O2 and/or operation O7) for said phone call. The recording made could advantageously constitute an opposable element of evidence in matters of fraud. Conversely, the analysis may lead to identify a sender number associated with said phone call as being a phone number of a legitimate user, i.e. not used for fraudulent purpose. In this case, this legitimate number could advantageously be stored in a white list LB, as will be described hereinafter. As such, the first robot 8 and/or the second robot 9 is advantageously configured (for example, using a specific computer script) to automatically pick up the call, and the system 1 may comprise, for example at the second server 7, modules for recording and analysing phone calls received by the first robot 8 and/or the second robot 9.

Advantageously, the method comprises, for at least one phone call (soliciting call) received by the first phone robot 8 at said internal robot number, an operation O13 of making, by the first phone robot 8, at least one return phone call to a target number identified for said received phone call (certified target number). This makes it possible to increase the chances that the internal robot number is recorded by fraudsters as a number used by a real person who can be easily tricked, and hence to encourage the fraudsters to make soliciting calls to the internal robot number to generate more return traffic. In other words, the first phone robot 8 thus plays advantageously a lure role, that is no longer only passive, but also active. It is therefore possible to detect and store new target numbers that, as certified target numbers, will be in turn compared (step E4) with the identified suspicious numbers for the phone calls made via the telephone network 2. Such reactive phone call may be made by the first phone robot 8 immediately after reception of a soliciting call and detection of the corresponding target number, and/or repetitively at regular time intervals or not over a predetermined time period after reception of a soliciting call and detection of the corresponding target number. Preferably, said operation O13 is automated.

For at least one target number, said operation O13 may thus advantageously comprise the making of a voice phone call by the first phone robot 8 to said target number. The first phone robot 8 may be configured to wait for the call to be picked up. In this case, optionally, it is possible to play for a predetermined duration a sound signal in order for the call made by the first phone robot 8 to the target number to simulate a call made from a real person. The sound signal may be a sound signal that has been previously stored, or selected among several previously stored sound signals. Advantageously, as will be described in more details hereinafter, the phone call made by the first phone robot 8 may be recorded for the purpose of analysis and/or evidence of the fraudulent nature of the target number. As an alternative, the first phone robot 8 may be configured (for example using a specific computer script) to hang up the call after a predetermined number of rings, without waiting for the call to be picked up. As an alternative, or in addition, said operation of making at least one phone call to a target number may include the sending of a text message (for example, SMS) or a multimedia message (for example, MMS) by the robot to said target number. In this case, the sent message may be an empty message. As an alternative, the sent message may be a message whose content is not empty and which has been previously generated and stored. Such a message may for example be selected among several previously stored messages.

As an alternative or a complement, the method may comprise, for at least one phone call (soliciting call) received this time by the second phone robot 9 at said external robot number, an operation O13' of making, by the second phone robot 9, at least one return phone call to a target number identified for said received phone call (certified target number). The principle of operation O13' is advantageously identical to that, exposed hereinabove, of operation O13. Preferably, said operation O13' is automated.

Symmetrically, the first robot(s) 8 and/or the second robot(s) 9 of the system 1 are hence advantageously configured to make at least one phone call to at least one certified target number, and the system 1 comprises software and/or hardware means for implementing operation O13 and/or operation O13' such as described hereinabove. Such software and/or hardware means may advantageously include at least one computer script, installed on the concerned robot(s) 8, 9 to define in particular the mode, the frequency and the duration of the calls to be made.

Advantageously, the method comprises an operation O14 of making, by a phone robot, using a phone number (robot number), a phone call to a suspicious number, identified at the end of step E3, when said suspicious number does not correspond, at the end of step E4, to a certified target number and/or a number belonging to a range of certified target numbers contained in the certification database. Such a phone call may be a voice phone call, or a text or multimedia message. According to preferential alternative, said phone robot is the first phone robot 8, in such a way that the call is made on the telephone network 2 of the concerned telephone operator. According to another alternative, said phone robot is the second phone robot 8, in such a way that the call is made this time on a telephone network of another telephone operator. According to still another alternative, said phone robot could possibly be distinct from said first and second phone robots 8, 9. Such a phone call may advantageously be made and handled in the manner already described hereinabove in relation with operation O13. This makes it possible, on the one hand, to increase the chances that the internal robot number is recorded by fraudsters as a phone number used by a real person who can be easily tricked, and hence to encourage the fraudsters to make soliciting calls to the robot number. It is therefore possible to detect and store new target numbers, and/or to define and store new ranges of new target numbers in the certification database, that will then be in turn compared (step E4) with the identified suspicious numbers for the phone calls made via said telephone network 2. In other hand, as will be described in more detail hereinafter, this may advantageously allow checking, by recording and analysing the content of the phone call made by the robot, whether the tested suspicious number is a target number. Preferably, said operation O14 is automated.

Symmetrically, the system 1 advantageously comprises at least one phone robot using a phone number (robot number), configured to make at least one phone call from the robot number and to an identified suspicious number. Preferably, as contemplated hereinabove, said phone robot is the first phone robot 8. The system 1 comprises, in addition to said phone robot, software and/or hardware means for implementing the above-described operation O14. For example, as in the embodiment illustrated in FIG. 1, the second server 7 may advantageously be configured to transmit a suspicious number, when the latter is not certified at the end of step E4, to the first phone robot 8. The latter is then advantageously configured to make at least one phone call to at least one suspicious number, and at least one computer script can be installed on the first phone robot 8 to define in particular the mode, the frequency and the duration of the calls to be made.

Preferably, the method comprises an operation O15 of collecting phone numbers and/or ranges of phone numbers, contained in at least one black list LN of numbers and/or ranges of number that have been reported as having been involved (or at least as being highly suspected to have been involved) in the past in at least one soliciting call, called reported numbers or number ranges. Such numbers and number ranges have typically been reported by the telephone operator itself, or by third parties such as, for example, one or several other telephone operator(s), telephone network users, one or several professional organisms or associations operating in fraud fighting in the field of telecommunications, one or several actors specialized in the compilation and provision of black lists of phone numbers or number ranges, etc.

Advantageously, the method comprises an operation O16 of storing said reported numbers and/or number ranges in the certification database as certified target numbers or ranges of certified target numbers. Thus, as an alternative or preferably in addition to what has been described hereinabove as regard the feeding sources, the certification database is fed with such reported numbers and/or number ranges, for the certification (step E4) of suspicious numbers by comparison of these latter with said reported numbers and/or number ranges. Advantageously, the certification database is preferentially regularly updated (for example, on a daily basis), by repetition of said collecting operation O15 and storing operation O16.

In order to implement said operation O15, the system 1 advantageously comprises suitable software and/or hardware means. For example, the second server 7 can comprise a collection module configured to establish a remote data communication with one or several external storage areas (Internet site, FTP area, etc.) hosting one or several black lists LN of reported numbers and/or number ranges, as defined hereinabove. Advantageously, the second server 7 is configured to store said reported numbers and/or number ranges in the certification database (operation O16). Potentially, said so-collected reported numbers and/or number ranges may moreover be transmitted by the second server 7 to said first server 6, so that the latter store them into the above-mentioned list L2, either by creating a new entry into the list L2, or by incrementing corresponding statistics. Advantageously, each new entry or statistics incrementation in the list L2 is time stamped.

As a complement or as an alterative, the method can advantageously comprise an operation O17 of making, by a phone robot, using a phone number (robot number), at least one phone call to at least one of said reported numbers or to at least one number belonging to one of said ranges of reported numbers. Such a phone call may be a voice phone call, or a text or multimedia message. According to preferential alternative, said phone robot is the first phone robot 8, in such a way that the phone call is made on said telephone network 2 of the concerned telephone operator. According to another alternative, said phone robot is the second phone robot 8, in such a way that the call is made this time on a telephone network of another telephone operator. According to still another alternative, said phone robot could possibly be distinct from said first and second phone robots 8, 9. Such a phone call may advantageously be made and handled in the manner already described hereinabove in relation with operation O13 of making, by the first phone robot 8, a phone call to a target number. Preferably, said operation O17 is automated. This makes it possible, on the one hand, to increase the chances that the robot number is recorded by fraudsters as a phone number used by a real person who can be easily tricked, and hence to encourage the fraudsters to make soliciting calls to the robot number. It is therefore possible to detect and store new target numbers, and/or to define and store new ranges of new target numbers in the certification database, that will then be in turn compared (step E4) with the identified suspicious numbers for the phone calls made via said telephone network 2. In other hand, as will be described in more detail hereinafter, this may advantageously allow checking, by recording and analysing the content of the phone call made by the phone robot, whether the so-tested reported number is actually a target number. Indeed, the reliability of reported numbers or number ranges contained in black lists LN may potentially vary according to the actors involved in the building of these latter and according to their update frequency (in view in particular of the sometimes very time-limited nature, for example over a range of a few minutes, of frauds that are however massive). In particular, it may be possible that a phone number has been wrongly reported as being a fraudulent target number, or also that a phone number rightfully reported as having been a target number at a given moment is no longer so at a latter moment, following a reallocation of said number to a legitimate subscriber, for example, and that the black list has not yet been accordingly updated.

Symmetrically, the system 1 advantageously comprises at least one phone robot using a phone number (robot number), configured to make at least one phone call from the robot number and to a reported number and/or a number belonging to a range of reported numbers. Preferably, as contemplated hereinabove, said phone robot is the first phone robot 8. The system 1 comprises, in addition to said phone robot, software and/or hardware means for implementing the above-described call making operation O17. For example, as in the embodiment illustrated in FIG. 1, the second server 7 may advantageously be configured to transmit to the first phone robot 8 a reported number and/or a number belonging to a range of reported numbers. The first phone robot 8 is then advantageously configured to make at least one phone call to at least one such number, and at least one computer script can be installed on the first phone robot 8 to define in particular the mode, the frequency and the duration of the calls to be made.

Preferably, the method comprises an operation O18 of building a list of premium-rate phone numbers and/or ranges of premium-rate phone numbers. Advantageously, such a list may be built, at least in part, by collecting premium-rate phone numbers, and/or ranges of premium-rate phone numbers, contained in at least one third-party list LS, public or private, of premium-rate numbers or number ranges. Typically, they are premium rate Value-Added Service (VAS) numbers or number ranges (also "Premium Rate Number" (PRN) or "International Premium-Rate Number" (IPRN)), well known as such.

As an alternative or a complement, such a list may be built and subsequently updated, at least in part, by analysis of billing data relating to phone calls made by subscribers of the telephone operator, and/or relating to phone calls made by a phone robot within the framework of at least one of above-described operations O13/O13', O14 and/or also O17. Advantageously, said list of premium-rate phone numbers and/or premium-rate number rates is preferentially updated on a regular basis (for example, daily), by repetition of said operation O18. In order to implement said operation O18, the system 1 advantageously comprises suitable software and/or hardware means. For example, the second server 7 can comprise a module configured to establish a remote data communication with one or several external storage areas (Internet site, FTP area, etc.) hosting one or several third-party lists L_, public or private, of premium-rate numbers and/or number ranges, as defined hereinabove. The second server 6 further advantageously comprises a list management module to store into a list the so-collected premium-rate numbers and/or number ranges.

Several different additional operations may advantageously be implemented from such premium-rate numbers or number ranges in order to further improve the performances of the fraud fighting method.

In particular, the method can then advantageously comprise an operation O19 of comparing the suspicious number identified during step E3 with at least one premium-rate number and/or matching a suspicious number with at least one range of premium-rate numbers, and an operation O20 of modifying the risk profile of said suspicious number according to whether said suspicious number corresponds or not to a premium-rate number and/or to a number belonging to a range of premium-rate numbers. The risk level associated with the suspicious number could thus be advantageously considered as being higher if the suspicious number is a premium-rate phone number or if it belongs to a range of premium-rate numbers, considering the economical impact linked to the premium-rate nature of the number. For example, in the list L1 of suspicious numbers, the above-mentioned "Risk Profile" field may comprise a "Premium-rate number" parameter able to take a "Yes/No" binary value according to the result of the so-performed additional comparison. Advantageously, said operation O19 and said operation O20 are repeated on a regular basis, and for example a daily basis, in order to maintain the most up-to-date risk profile possible.

Symmetrically, the system 1 advantageously moreover comprises software and/or hardware means for implementing the above-described operations O19 and O20. For example, as in the embodiment illustrated in FIG. 1, the second server 7 may advantageously be configured to carry out the comparison/matching operation O19, and to transmit to the first server 6 information relating to the result of the comparison/matching, said first server 6 being then configured to carry out the operation O20 of modifying the risk profile of said suspicious number.

As a complement or as an alternative, the method can advantageously comprise an operation O21 of making, by a phone robot, using a phone number (robot number), at least one phone call to at least one of said premium-rate numbers or to at least one number belonging to one of said ranges of premium-rate numbers. Such a phone call may be a voice phone call, or a text or multimedia message. According to preferential alternative, said phone robot is the first phone robot 8, in such a way that the call is made on the telephone network 2 of the concerned telephone operator. According to another alternative, said phone robot is the second phone robot 8, in such a way that the call is made this time on a telephone network of another telephone operator. According to still another alternative, said phone robot could possibly be distinct from said first and second phone robots 8, 9. Such a phone call may advantageously be made and handled in the manner already described hereinabove in relation with operation O13. This makes it possible, on the one hand, to increase the chances that the robot number is recorded by fraudsters as a number used by a real person who can be easily tricked, and hence to encourage the fraudsters to make soliciting calls to the robot number. It is therefore possible to detect and store new target numbers, and/or to define and store new ranges of new target numbers in the certification database, that will then be in turn compared (step E4) with the identified suspicious numbers.

Symmetrically, the system 1 advantageously comprises at least one phone robot using a phone number (robot number), configured to make at least one phone call from the robot number and to at least one of said premium-rate numbers or at least one number belonging to one of said ranges of premium-rate numbers. Preferably, as contemplated hereinabove, said phone robot is the first phone robot 8. The system 1 comprises, in addition to said phone robot, software and/or hardware means for implementing the above-described operation O21. For example, as in the embodiment illustrated in FIG. 1, the second server 7 may advantageously be configured to transmit to the first phone robot 8 one of said phone robot numbers or a number belonging to a range of premium-rate numbers. The first phone robot 8 is then advantageously configured to make at least one phone call to at least one such number, and at least one computer script can be installed on the first phone robot 8 to define in particular the mode, the frequency and the duration of the calls to be made.

Advantageously, in the case in which, as contemplated hereinabove, at least one return phone call is made to at least one target number identified for a phone call received by the first phone call 8 (operation O13) and/or the second phone robot 9 (operation O13'), and/or to at least one suspicious number (operation O14), when the latter does not corresponds, at the end of step E4, to a certified target number and/or to a number belonging to a range of certified target numbers contained in the certification database, and/or to at least one reported number or to at least one number belonging to a range of reported numbers (operation O17), and/or to at least one premium-rate number or to at least one number belonging to a range of premium-rate numbers (operation O21), said phone call made is then a voice phone call, and the method advantageously comprises an operation O22 of recording and an operation O23 of analysing a content of said voice phone call. Between the recording and analysis operations O19 and O20, an operation of transcribing the content of the voice phone call can possibly be implemented in order to facilitate the analysis of said content.

Such recording and analysis operations O22 and O23 can advantageously allow establishing or confirming that the number so called back by the phone robot is a target number, i.e. a number used for fraudulent purposes. In this case, said number can then advantageously be added to the list L2 of certified target numbers. Said number can advantageously be stored into the certification database, if it is not already the case, to be compared to the identified suspicious numbers. Conversely, said recording and analysis operations O22 and O23 can advantageously allow qualifying the called-back phone number as being a non-fraudulent phone number that is legitimately used. In this case, this legitimate number could advantageously be stored in a white list LB, as will be described hereinafter.

Symmetrically, the fraud fighting system 1 advantageously comprises module for recording and analysing the content of a phone call made that way within the framework of all or part of said operations O13/O13', O14, O17 and O21. Said system 1 can comprise for example a server for storing the so-recorded content, wherein said server may be said second server 7 (or belong to said second set of servers 7) or be distinct from the latter and be connected to it in data communication. Said analysis module may be designed and configured to carry out an automated analysis of said recorded content, for example based on recognition of keywords, predefined standard sequences, etc., or to be implemented manually by an analyst.

As such, the fraud fighting method comprises:

an operation O24 of building, then subsequently updating, a white list LB of phone numbers and/or ranges of phone numbers previously identified as being not fraudulent, i.e. as being not particular target numbers, an operation O25 of comparing at least one suspicious number identified during step E3 with at least one non-fraudulent number contained in the white list LB or an operation of matching a suspicious number with at least one range of non-fraudulent numbers contained in said white list LB, and an operation O26 of modifying the risk profile of said suspicious number according to whether said suspicious number corresponds or not to a non-fraudulent number or to a number belonging to a range of non-fraudulent numbers, contained in the white list LB.

The risk level associated with the suspicious number identified during step E3 can indeed thus be advantageously considered as being lower, if not zero, if the suspicious number is moreover known as being non-fraudulent. For example, in the list L1 of suspicious numbers, the above-mentioned "Risk Profile" field may comprise a "White list" parameter able to take a "Yes/No" binary value according to the result of the so-performed matching. This advantageously allows avoiding the implementation of a protection action, as for example a blocking, against phone numbers that could be identified as suspicious by the detection algorithm(s), but that could correspond in reality to a perfectly legitimate use of the telephone network. Advantageously, such a white list LB may be built and maintained up-to-date, at least in part, by collecting and storing numbers and/or number ranges contained in at least one third-party list, public or private, of phone numbers or ranges of phone numbers deemed not to be fraudulent (business customer service numbers, public administration numbers, etc.). As an alternative or as a complement, the white list LB can also possibly be built and updated from numbers or number ranges provided by the telephone operator itself, and/or by collecting individual numbers on Internet sites, and/or also from numbers identified as being non-fraudulent after analysis (operation O23) of the content of a phone call made by either one of the above-described phone robots within the framework of at least one of the above-described operations O13/O13', O14, O17 and/or also O21. Advantageously, the above-mentioned operations O25 and O26 are repeated on a regular basis, and for example a daily basis, in order to maintain the most up-to-date risk profile possible.

Symmetrically, the system 1 advantageously comprises software and/or hardware means for implementing the above-described steps O24, O25 and O26. For example, as in the embodiment illustrated in FIG. 1, the second server 7 may advantageously be configured to carry out the operation O25 of comparison/matching, and to transmit to the first server 6 information relating to the result of the comparison/matching, said first server 6 being then configured to carry out the operation O26 of modifying the risk profile of said suspicious number. As explained hereinabove, the non-fraudulent numbers and number ranges in white list LB can in particular come from the telephone operator, which can advantageously provide numbers and/or number ranges desired to be placed into the white list LB, through for example a user interface module 10 that may advantageously be included in the system 1. As an alternative or as a complement, the second server 7 can in particular comprise a module configured to establish a remote data communication with one or several external storage areas (Internet site, FTP area, etc.) hosting one or several third-party lists, public or private, of phone numbers or ranges of phone numbers deemed not to be fraudulent. As an alternative or as a complement, the second server 7 can moreover comprise, as already contemplated hereinabove, a module for analysing phone calls made by a phone robot within the framework of all or part of said above-described operations O13/O13', O14, O17 and O21 for identifying in particular among suspicious, reported and/or premium-rate numbers possible numbers that would not be fraudulent in reality.

Particularly advantageously, step E2 of detecting suspicious phone calls may include a reading of at least one phone number or at least one range of phone numbers contained in said white list LB, in order to refine and accelerate the detection by taking into account, the detection algorithm(s), only phone calls involving a sender number that does not correspond to a phone number or a range of phone numbers contained in said white list LB.

Insofar as, as described hereinabove, the certification database is regularly fed, updated, in parallel to the execution of steps E1 to E5, the method advantageously comprises at least one iteration of steps E4 and E5 of the method, and for each suspicious number identified at the end of step E3. That way, the risk profile of the suspicious numbers may be updated on a regular basis, in order to refine the accuracy and efficiency of the fraud fighting method.

In order to further refine the definition of the risk profile attached to each suspicious number identified at the end of step E3, it is advantageously possible to introduce a distinction in matters of degree (or mode) of certification, according in particular to the source(s) from which come the certified target number and/or the range of certified target numbers that has allowed certifying a given suspicious number as a target number. By way of non-limiting example, it is advantageously possible to distinguish, for each suspicious number, if it corresponds at the end of step E4:

1) to a target number (and/or a number belonging to a range of target numbers), that has previously been identified for phone calls received by said first phone robot 8 using at least one internal robot number managed by the telephone operator involved in the method; and/or
2) to a target number (and/or a number belonging to a range of target numbers), that has previously been identified for phone calls received by said second phone robot 9 using at least one external robot number managed by another telephone operator; and/or to a reported number (and/or a number belonging to a range of reported numbers); and/or
3) to a target number (and/or a number belonging to a range of target numbers), which has been identified as such at the end of the operation O23 of analysing the content of a voice phone call made by a phone robot (operation O14) to said suspicious number; and/or also
4) to a number belonging to a same range of numbers as a target number identified at the end of the implementation of said operation O23 for another suspicious number.

In this case, the above-mentioned "Certified" parameter of the risk profile of each suspicious number could be a composite parameter reflecting such a distinction. Of course, a same suspicious number could possibly meet several of the above-mentioned certification degrees, taking into account in particular the advantageously iterative nature of steps E3 and E4, and the regular updating of the certification database.

For the purpose in particular of a potential step of triggering, in reaction to the identification of a suspicious number, one or several differentiated protection actions against the fraud according to the risk profile of an identified suspicious number, the fraud fighting method preferably comprises, for each suspicious phone call detected at step E3:

an operation O27 of identifying a phone number of a user (subscriber or user in roaming situation) of the telephone network 2 who is the recipient of the suspicious phone call, and an operation O28 of storing the phone number of said recipient user into a list L3 of recipient numbers, called hereinafter list L3 of (potentially) impacted user numbers.

Advantageously, said recipient number of a suspicious phone call is contained, as such, in the network signalling data collected in relation with the concerned suspicious phone call. The concerned user can be a subscriber of the telephone operator, or a subscriber of another concerned operator in roaming situation of the telephone network 2 of the telephone operator. Each recipient number of a suspicious phone call is advantageously stored into said list L3, either by creation of a new entry in the list L3 when the impacted user number is not contained in the latter, or by incrementing statistics linked to said impacted user when the latter has already been identified in the past. Advantageously, each new entry or statistics incrementation in the list L3 is time stamped.

Advantageously, said list L3 of impacted user numbers may further comprise, in relation with each of the so-listed impacted user numbers, statistics relating in particular to, for example:

the identified suspicious phone calls to said impacted user number total number of identified suspicious phone calls, total duration of the phone calls (in the case of phone calls in the form of voice phone calls), date and hour of the first identified suspicious phone call, date and hour of the last identified suspicious phone call, etc.

and/or possible phone calls made from said impacted user number in response to suspicious phone calls: number of phone calls, total duration of the phone calls (in the case of phone calls in the form of voice phone calls), and/or also possible phone calls made from said impacted user number to one or several phone numbers of client services of the telephone operator (wherein said client service phone numbers may possibly have previously been listed in a dedicated list).

Symmetrically, the system 1 advantageously comprises software and/or hardware means for implementing the above-described operations O27 and O28 of the method. In particular, as in the embodiment illustrated in FIG. 1, the detection platform 5 is advantageously configured to identify, for each detected suspicious phone call, a phone number of a recipient user of said suspicious phone call, and to transmit to the first server 6 information relating to the so-identified recipient number. Said first server 6 advantageously comprises a list management module to store information relating to recipient numbers so transmitted by the detection platform 5 in a list L3 of impacted user numbers, as mentioned hereinabove.

Also for the purpose in particular of a potential step of triggering, in reaction to the identification of a suspicious number, one or several differentiated protection actions against the fraud according to the risk profile of an identified suspicious number, the fraud fighting method preferably comprises, as an alternative or as a complement, and for each detected suspicious phone call:

an operation O29 of identifying a call originating phone number used to make or route said suspicious phone call, and an operation O30 of storing said originating number into a list L4 of originating numbers.

Advantageously, the originating number of a suspicious phone call is contained, as such, in the network signalling data collected in relation with the concerned suspicious phone call. Each originating number of a suspicious phone call is advantageously stored into a list L4 of originating numbers, either by creating a new entry in the list L4 when the originating number is not contained in the latter, or by incrementing statistics linked to said suspicious number when the latter has already been identified in the past. Advantageously, each new entry or statistics incrementation in the list L4 is time stamped. Advantageously, the same operations O29 and O30 may be carried out for each phone call (soliciting call) received at one and/or the other of the first and second phone robots 8, 9, for example by analysing a generated call detail report (CDR).

Advantageously, said list L4 of originating numbers can further comprise, in relation with each of the so-listed originating numbers, statistics relating to the detected suspicious phone calls that have been made or routed by said originating number, such as for example:

a total number of detected suspicious phone calls that have been made or routed by the originating number, and for each of which a corresponding suspicious number has thus been identified and stored;

a time stamp of the detection of the first one of the detected suspicious phone calls that have been made or routed by the originating number;

time stamps of the detection of the most recent one of the detected suspicious phone calls made or routed by the originating number, for which the corresponding suspicious number has been identified, in its risk profiles, as corresponding to:

only a suspicious number ("Suspicious" parameter of "Yes" value), a certified target number ("Certified" parameter of "Yes" value).

Symmetrically, the system 1 advantageously comprises software and/or hardware means for implementing the above-described operations O29 and O30 of the method. In particular, as in the embodiment illustrated in FIG. 1, the detection platform 5 is advantageously configured to identify, for each detected suspicious phone call, a call originating phone number used to make and route said suspicious phone call, and to transmit to the first server 6 information relating to the so-identified originating number. Potentially, the second server 7 may be configured to identify, for each soliciting call received by one and/or the other of the first and second phone robots 8, 9, a call originating phone number. As already explained, the latter may possibly be different from the corresponding target number identified for said soliciting call. In this case, the second server 7 is thus advantageously configured to transmit to the first server 6 information relating to so-identified originating numbers. In return, said first server 6 also advantageously comprises a list management module to store, into a list L4 of originating numbers as mentioned hereinabove, information relating to originating numbers so transmitted by the detecting platform 5 and/or by the second server 7.

Particularly advantageously, the fighting method thus makes it possible to obtain at least the following lists, among those described hereinabove:

a list L1 of suspicious numbers, identified for phone calls detected as being suspicious among phone calls made via said telephone network 2, wherein a risk profile has been defined for each of said suspicious numbers. When the suspicious phone calls are in particular voice phone calls, the suspicious numbers are typically sender numbers, as explained hereinabove;

a list L2 of certified target numbers and/or ranges of certified target numbers, identified for phone calls (soliciting calls) received by one and/or the other of the first and second phone robots 8, 9, and/or corresponding to reported numbers and/or number ranges;

a list L3 of (potentially) impacted user numbers, i.e. phone numbers recipient of phone calls detected as being suspicious among phone calls made via said telephone network 2;

a list L4 of originating numbers associated with at least phone calls detected as being suspicious among the phone calls made via said telephone network 2, and preferably also, of originating numbers associated with phone calls (soliciting calls) received by one and/or the other of the first and second phone robots 8, 9.

Even more advantageously, as mentioned hereinabove, the above-described lists L1 and L2 form a single and same list L1L2 of suspicious and/or certified target numbers, in such a way that the fighting method thus advantageously allows obtaining at least three lists, i.e. the lists L1L2, L3 and L4.

Advantageously, the fraud fighting method comprises an operation O31 of sending or requesting to send a warning message, preferably a text message (message in the SMS format), to a number contained in said list L3 of impacted user numbers, according to a predefined warning rule based on the risk profile of said suspicious number. For example, said warning message may include the following text or any other suitable text: "Be careful when calling back an unknown number that has called you in the past. Calling back an unknown number, especially to an international destination, may incur additional charges.". Said operation O31 thus aims to avoid that a user, who has received a call detected as being suspicious, makes in return a voice phone call or a message (text or multimedia) to a phone number that has been identified as liable to be used for fraudulent purpose. At the discretion of the concerned telephone operator, the predefined warning rule could possibly concern any suspicious number, whatever its risk profile, in such a way that any user having received a phone call detected as suspicious will be sent a warning message. Preferably, the predefined warning rule is further based on a time criterion relating to a suspicious phone call received by the user, in such a way as to send a warning message only to a user having received a suspicious phone call in a given past time period (for example, in the ten minutes following the detection of a suspicious phone call).

Preferably, each operation of sending or requesting to send a warning message is time stamped, and statistics relating to the sending of warning message(s) are added into or updated within the list L3 of impacted user numbers. For example, a "Warning history" field is integrated into or updated within the list L3, for each of said impacted user numbers, and may comprise all or part of the following parameters: date and hour of the first warning message sending, date and hour of the most recent warning message sending, total number of warning message sent, etc. Even more preferentially, said predefined warning rule may then be based on a time criterion relating to a preceding sending of warning message to a given impacted user number, in such a way as to send a warning message only if the concerned impacted user number has not yet been the recipient of such a warning message in a given past time period (for example, within the twenty-four hours that follow the sending of a preceding warning message).

Said operation O31 of sending or requesting to send a warning message thus advantageously comprises establishing, from the list L3 of impacted user numbers and by application of said predefined warning rule, a sub-list L31 of to-be-warned user numbers to which a warning message has to be sent. Advantageously, said sub-list L31 is established, then updated, at a predefined frequency, typically by the telephone operator (for example, every five minutes). Said sub-list L31 can then be transmitted, at the above-mentioned frequency, to a message sending device through, for example, a list dispatcher.

Symmetrically, the system 1 advantageously comprises software and/or hardware means for implementing the above-described operation O31. In particular, as in the embodiment illustrated in FIG. 1, the first server 6 is advantageously configured to implement the above-mentioned operation L31, from said list L3 of impacted user numbers. For that purpose, the first server 6 is advantageously configured to establish said sub-list L31 of to-be-warned user numbers and, even more advantageously to transmit said sub-list L31 to a message sending device 11, through for example a list dispatcher that may the advantageously be included in the first server 6 of the system 1. As an alternative, retained in the embodiment illustrated in FIG. 1, said message sending device 11 does not belong as such to the fraud fighting system 1. As another alternative, said system 1 may on the contrary comprise said message sending device 11.

Advantageously, the fraud fighting method comprises an operation O32 of blocking or requesting to block, preferably temporarily, at least one (incoming) phone call made or routed by at least one originating number contained in said list L4 of originating numbers to at least one number of a user (subscriber or user in roaming situation) of the telephone network 2, according to a predefined reception blocking rule based on the risk profile of said suspicious number. Said blocking or blocking request operation O32 thus aims to protect, at least temporarily, the users of the telephone network against the reception of soliciting calls, by upstream blocking phone calls that would be addressed to them and that would come from an originating number identified as having made or routed a suspicious phone call. As an alternative or as a complement, said operation O32 may be implemented in the same way against at least one phone call made or routed by at least one originating number identified for a soliciting call received by one and/or the other of the first and second phone robots 8, 9, and that even if this originating number has not been identified, as such, for a suspicious phone call detected from collected signalling data. At the discretion of the concerned telephone operator, the predefined reception blocking rule could possibly concern only certain suspicious numbers, whose risk profile is considered as being particularly high. For example, the reception blocking rule could relate only suspicious numbers that have been effectively certified as target numbers at the end of step E4 of comparing with at least one certified target number and/or at least one range of certified target numbers contained in the certification database. Possibly, the reception blocking rule could introduce a distinction according to the above-mentioned certification degree, and for example according to the source from which comes the certified target number and/or the range of certified target numbers that has allowed a given suspicious number to be certified as a target number. Preferably, the predefined reception blocking rule is further based on a criterion of number of suspicious phone calls detected, over a given past time period, in connection with a given originating number, in order not to block phone calls made or routed by the latter only beyond a predefined threshold of detected suspicious phone calls.

Said operation O31 thus advantageously comprises establishing, from the list L4 of originating numbers and by application of said reception blocking rule, a sub-list L41 of originating numbers for which phone calls made are to be blocked during at least one given blocking duration (if the blocking is not permanent). Advantageously, said sub-list L41 of to-be-blocked originating numbers is established, then updated, at a predefined frequency, typically by the telephone operator (for example, every five minutes). Said sub-list L41 can then be transmitted, at the above-mentioned frequency, to a reception call blocking device 12, through, for example, a list dispatcher. Preferably, each operation of blocking or requesting to block an (incoming) phone call made or routed by an originating number contained in said list L4 of originating numbers is time stamped, and statistics relating to the blocking or blocking request are added into or updated within the list L4 of originating numbers. For example, a "Blocking history" field is integrated into or updated within the list L4, for each of said originating numbers, and may comprise all or part of the following parameters: date and hour of the first blocking or first blocking request, date and hour of the most recent blocking or most recent blocking request, blocking or blocking request number, total blocking duration, etc.

When an originating number contained in said list L4 of originating numbers is a phone number (fixed or mobile) managed by the telephone operator operating the concerned telephone network 2, the method preferentially comprises an operation of deactivating a subscription associated with said originating number. Symmetrically, when a certified target number contained in the certification database is a phone number managed by said telephone operator, the method preferentially comprises an operation of deactivating a subscription associated with said certified target number.

Symmetrically, the system 1 advantageously comprises software and/or hardware means for implementing the above-described operation O31. In particular, as in the embodiment illustrated in FIG. 1, the first server 6 is advantageously configured to implement the above-mentioned operation O31, from said list L4 of originating numbers. For that purpose, the first server 6 is advantageously configured to establish said sub-list L41 and, even more advantageously to transmit said sub-list L41 to a reception call blocking device 12, through, for example, a list dispatcher that may advantageously be included in the first server 6 of the system 1 (as mentioned hereinabove). As an alternative, retained in the embodiment illustrated in FIG. 1, said reception call blocking device 12 does not belong as such to the fraud fighting system 1. As another alternative, said system 1 may on the contrary comprise said reception call blocking device 12.

Advantageously, the fraud fighting method comprises an operation O33 of blocking or requesting to block, preferably temporarily, at least one (outgoing) phone call made by a user (subscriber or user in roaming situation) of the telephone network 2 to at least one suspicious number, according to a predefined transmission blocking rule based on the risk profile of said suspicious number. Said operation O33 thus aims to protect, at least temporarily, the users and the operator of the telephone network 2 by blocking phone calls made by the users of the telephone network 2 to a suspicious number that has been identified for a suspicious phone call. As an alternative or as a complement, said blocking or blocking request operation O33 may be implemented in the same way against at least one phone call made by a user of the telephone network 2 to at least one known certified target number and/or to a phone number belonging to a known range of certified target numbers, contained in the certification database, and that even if this number has not been identified, as such, for a suspicious phone call detected from collected signalling data. At the discretion of the concerned telephone operator, the predefined transmission blocking rule could possibly concern only certain suspicious numbers, whose risk profile is considered as being particularly high. For example, the transmission blocking rule could relate only to suspicious numbers that have been effectively certified as target numbers at the end of step E4 of comparing with at least one certified target number and/or at least one range of certified target numbers contained in the certification database. Possibly, the blocking rule could introduce a distinction according to the source from which comes the certified target number and/or the range of certified target numbers that has allowed a given suspicious number to be certified as a target number. Preferably, the predefined transmission blocking rule is further based on a criterion of number of suspicious phone calls detected, over a given past time period, in connection with a given suspicious number, in order not to block phone calls made to said suspicious number only beyond a predefined threshold of detected suspicious phone calls.

Preferably, each outgoing phone call blocking or blocking request is time stamped. Advantageously, statistics relating to the blocking or blocking request are added into or updated in the list L1 of suspicious numbers (or in the list L1L2 of suspicious and/or certified target numbers). For example, a "Blocking history" field is integrated into or updated within the list L1 (or in the list L1L2), for each of said suspicious numbers (or even also each of the certified target numbers), and may comprise all or part of the following parameters: date and hour of the first blocking or first blocking request, date and hour of the most recent blocking or most recent blocking request, blocking or blocking request number, total blocking duration, etc.

Said blocking or blocking request operation O33 thus advantageously comprises establishing, from the list L1 of suspicious numbers (or the list L1L2 of suspicious numbers and/or certified target numbers) by application of said transmission blocking rule, a sub-list L11 of suspicious numbers (or also certified target numbers or number ranges) to which outgoing phone calls, made by users of the phone call, have to be blocked during at least a given blocking duration (if the blocking is not permanent). Advantageously, said sub-list L11 is established, then updated, at a predefined frequency, typically by the telephone operator (for example, every five minutes). Said sub-list L11 can then be transmitted, at the above-mentioned frequency, to a transmission call blocking device 13, through, for example, a list dispatcher.

Symmetrically, the system 1 advantageously comprises software and/or hardware means for implementing the above-described operation O33. In particular, as in the embodiment illustrated in FIG. 1, the first server 6 is advantageously configured to implement the above-mentioned operation O33, from the list L1 of suspicious numbers (or the list L1L2 of suspicious and/or certified target numbers). For that purpose, the first server 6 is advantageously configured to establish said sub-list L11 and, even more advantageously to transmit said sub-list L11 to a transmission call blocking device 13, through for example a list dispatcher that may advantageously be included in the first server 6 of the system 1 (as mentioned hereinabove). As an alterative, retained in the embodiment illustrated in FIG. 1, said transmission call blocking device 13 does not belong as such to the fraud fighting system 1. As another alternative, said system 1 may on the contrary comprise said transmission call blocking device 13.

Eventually, as can be seen from the above description, the method and system 1 according to the invention allow quick and accurate detection of fraudulent soliciting calls, and quick and quick and efficient implementation of appropriate and targeted remedies against fraud. These new method and system are advantageously substantially transparent or particularly low impact for the legitimate users of the telephone networks. Particularly efficient, these new method and system are yet relatively simple to deploy and implement with any telephone operator in the world, based in particular on telecommunications standards. Finally, said phone fraud fighting method and system 1 are particularly adaptable to the needs and strategies of the telephone operators as regards fraud fighting.

POSSIBILITY OF INDUSTRIAL APPLICATION

The present invention finds its application in the general technical field of telecommunications, and in particular phone calls. More specially, the invention finds its application in the technical field of methods and systems for fighting against phone frauds.

The invention claimed is:

1. A method for fighting a phone fraud comprising the making of a phone call, called soliciting call, soliciting a return phone call to a phone number, called target number, said method comprising the following steps:
   collecting data signalling phone calls made via a telephone network of a telephone operator;
   detecting suspicious phone calls from collected signalling data and using at least one detection algorithm, and for each detected suspicious phone call, identifying and storing a phone number, called suspicious number, to which said phone call is suspected to fraudulently solicit a return phone call to be made;
   comparing said suspicious number with at least one phone number and/or at least one range of phone numbers, called certified target numbers, contained in a certification database;
   defining for said suspicious number a different risk profile according to whether said suspicious number corresponds or not to a certified target number and/or to a number belonging to a range of certified target numbers contained in said certification database;
   building a list of premium-rate phone numbers and/or ranges of premium-rate phone numbers;
   comparing said suspicious number with at least one premium-rate number and/or matching a suspicious number with at least one range of premium-rate numbers; and
   modifying the risk profile of said suspicious number according to whether said suspicious number corresponds or not to a premium-rate number and/or to a number belonging to a range of premium-rate numbers.

2. The method according to claim 1, wherein said signalling data are collected using a device for collecting network signalling data consisted of a network signalling probe system connected to said phone network.

3. The method according to claim 1, wherein step of collecting signalling data consists in collecting, in real time or almost real time, data relating to phone numbers involved in said phone calls as well as, preferably, time data relating to said phone calls.

4. The method according to claim 1, wherein step of detecting suspicious phone calls implements a behaviour analysis of the phone calls for which signalling data have been collected during the collection step.

5. The method according to claim 1, wherein step of defining the risk profile comprises an operation of storing the so-defined risk profile.

6. The method according to claim 1, which comprises an operation of receiving at least one phone call by at least one first phone robot using at least one phone number managed by the telephone operator and, for a so-received phone call, an operation of identifying a corresponding target number, which is followed with an operation of storing the identified target number into said certification database as a certified target number.

7. The method according to claim 1, which comprises an operation of receiving at least one phone call by at least one second phone robot using at least one phone number managed by another telephone operator and, for a so-received phone call, an operation of identifying a corresponding target number, which is followed with
- an operation of storing said identified target number into said certification database as a certified target number, and/or
- an operation of defining a range of target numbers including said identified target number and an operation of storing said range of target numbers into said certification database as a range of certified target numbers.

8. The method according to claim 6, wherein, for at least one phone call received by the first or the second phone robot, said method comprises an operation of making, by said first or second phone robot at least one return phone call to a target number identified for said received phone call.

9. The method according to claim 1, which comprises an operation of making, by a phone robot, a phone call to a suspicious number, when said suspicious number does not correspond to a certified target number and/or a number belonging to a range of certified target numbers contained in said certification database.

10. The method according to claim 1, which comprises an operation of collecting phone numbers and/or ranges of phone numbers, contained in at least one black list of numbers and/or ranges of numbers that have been reported as having been involved in the past in at least one soliciting call, called reported numbers or ranges of numbers.

11. The method according to claim 10, which comprises an operation of storing said reported numbers and/or ranges of numbers into said certification database as certified target numbers or ranges of certified target numbers.

12. The method according to claim 10, which comprises an operation of making, by a phone robot, at least one phone call to at least one of said reported numbers or to at least one number belonging to one of said ranges of reported numbers.

13. The method according to claim 1, which comprises an operation of making, by a phone robot, at least one phone call to at least one of said premium-rate numbers or to at least one number belonging to one of said ranges of premium-rate numbers.

14. The method according to claim 8, wherein the phone call made is a voice phone call, said method comprising an operation of recording and an operation of analysing a content of said voice phone call.

15. The method according to claim 1, which comprises:
- an operation of building a white list of phone numbers and/or ranges of phone numbers previously identified as being non-fraudulent,
- an operation of comparing said suspicious number with at least one non-fraudulent number contained in a white list or an operation of matching a suspicious number with at least one range of non-fraudulent numbers contained in a white list, and
- an operation of modifying the risk profile of said suspicious number according to whether said suspicious number corresponds or not to a non-fraudulent number contained in a white list or to a number belonging to a range of non-fraudulent numbers contained in a white list.

16. The method according to claim 1, which comprises, for each detected suspicious phone call, an operation of identifying a phone number of a user of the telephone network who is the recipient of said suspicious phone call, and an operation of storing the phone number of said recipient user into a list of recipient numbers, called list of impacted user numbers.

17. The method according to claim 16, which comprises an operation of sending or requesting to send a warning message, preferably in the SMS format, to a number contained in said list of impacted user numbers, according to a predefined warning rule based on the risk profile of said suspicious number.

18. The method according to claim 1, which comprises, for each detected suspicious phone call, an operation of identifying a call originating phone number used to make or route said suspicious phone call, and an operation of storing said originating number into a list of originating numbers.

19. The method according to claim 18, which comprises an operation of blocking or requesting to block, preferably temporarily, at least one phone call made or routed by at least one originating number contained in said list of originating numbers to at least one number of a user of the telephone network, according to a predefined reception blocking rule based on the risk profile of said suspicious number.

20. The method according to claim 1, which comprises an operation of blocking or requesting to block, preferably temporarily, at least one phone call made by a user of the telephone network to at least one suspicious number, according to a predefined reception blocking rule based on the risk profile of said suspicious number.

21. A system for fighting a phone fraud comprising the making of a phone call, called soliciting call, soliciting a return phone call to a phone number, called target number, said system comprising:
- a network signalling data collecting device for collecting data signalling phone calls made via a telephone network of a telephone operator, and
- software and/or hardware means for:
  - collecting data signalling phone calls made via a telephone network of a telephone operator;
  - detecting suspicious phone calls from collected signalling data and using at least one detection algorithm, and for each detected suspicious phone call, identifying and storing a phone number, called suspicious number, to which said phone call is suspected to fraudulently solicit a return phone call to be made;
  - comparing said suspicious number with at least one phone number and/or at least one range of phone numbers, called certified target numbers, contained in a certification database;

defining for said suspicious number a different risk profile according to whether said suspicious number corresponds or not to a certified target number and/or to a number belonging to a range of certified target numbers contained in said certification database;

building a list of premium-rate phone numbers and/or ranges of premium-rate phone numbers;

comparing said suspicious number with at least one premium-rate number and/or matching a suspicious number with at least one range of premium-rate numbers; and modifying the risk profile of said suspicious number according to whether said suspicious number corresponds or not to a premium-rate number and/or to a number belonging to a range of premium-rate numbers.

* * * * *